(12) United States Patent
Ozawa et al.

(10) Patent No.: US 11,657,125 B2
(45) Date of Patent: May 23, 2023

(54) INFORMATION PROCESSING APPARATUS AND RESET CONTROL METHOD

(71) Applicant: CANON KABUSHIKI KAISHA, Tokyo (JP)

(72) Inventors: Manabu Ozawa, Nagareyama (JP); Takahiro Yamashita, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 323 days.

(21) Appl. No.: 17/021,451

(22) Filed: Sep. 15, 2020

(65) Prior Publication Data
US 2021/0089632 A1 Mar. 25, 2021

(30) Foreign Application Priority Data

Sep. 20, 2019 (JP) .............................. JP2019-171853
Dec. 6, 2019 (JP) .............................. JP2019-221449

(51) Int. Cl.
*G06F 21/12* (2013.01)
*G06F 9/54* (2006.01)
*G06F 9/445* (2018.01)
*G06F 21/52* (2013.01)

(52) U.S. Cl.
CPC ............ *G06F 21/121* (2013.01); *G06F 9/445* (2013.01); *G06F 9/542* (2013.01); *G06F 21/52* (2013.01)

(58) Field of Classification Search
CPC ........ G06F 9/4401; G06F 9/542; G06F 21/52; G06F 21/575; G06F 9/4881; G06F 9/44589; G06F 21/121; G06F 9/445

USPC ............................................................ 726/2
See application file for complete search history.

(56) References Cited

U.S. PATENT DOCUMENTS

| | | | | |
|---|---|---|---|---|
| 5,537,544 A * | 7/1996 | Morisawa | ............... | G06F 21/83 726/19 |
| 6,892,332 B1 * | 5/2005 | Gulick | ................ | G06F 11/3055 714/51 |
| 7,689,875 B2 * | 3/2010 | Cahill | ................. | G06F 11/0757 714/25 |
| 7,739,517 B2 * | 6/2010 | Sahita | ..................... | G06F 21/57 713/193 |
| 7,774,648 B2 * | 8/2010 | Majewski | ........... | G06F 11/0757 714/55 |

(Continued)

FOREIGN PATENT DOCUMENTS

JP 2009053952 A 3/2009

OTHER PUBLICATIONS

Shogo Imada, Cpu monitoring device and electronic control device Aug. 27, 2007, Denso Ten Ltd (Year: 2007).*

*Primary Examiner* — Samson B Lemma
(74) *Attorney, Agent, or Firm* — Rossi, Kimms & McDowell LLP

(57) ABSTRACT

There is provided an information processing apparatus that includes a first processor configured to verify a validity of a program, a control circuit configured to issue a system reset signal in a case where there is no access from outside for a predetermined period, and a second processor configured to execute the program that has been determined as valid by the first processor, and to become accessible to the control circuit after the program is initiated. The first processor is configured to access the control circuit before the second processor becomes accessible to the control circuit.

19 Claims, 11 Drawing Sheets

(56) References Cited

U.S. PATENT DOCUMENTS

| | | | | |
|---|---|---|---|---|
| 7,945,772 B2* | 5/2011 | Kawano | .................... | G06F 1/24 |
| | | | | 713/1 |
| 8,131,905 B2* | 3/2012 | Rofougaran | ...... | H04M 1/72412 |
| | | | | 710/303 |
| 8,823,500 B2* | 9/2014 | Heath | .................... | G16H 20/13 |
| | | | | 340/539.12 |
| 8,938,306 B2* | 1/2015 | Lebel | ................. | A61N 1/37264 |
| | | | | 607/60 |
| 9,292,302 B2* | 3/2016 | Sasaki | .................. | G06F 9/4401 |
| 10,067,834 B1* | 9/2018 | Montero | ............. | G06F 11/1417 |
| 2003/0225955 A1* | 12/2003 | Feldstein | ............. | H04M 11/066 |
| | | | | 710/306 |
| 2005/0216135 A1* | 9/2005 | Sayama | ................. | B60R 16/03 |
| | | | | 701/1 |
| 2008/0104701 A1* | 5/2008 | Peacock | ............... | G06F 21/725 |
| | | | | 726/22 |
| 2008/0276132 A1* | 11/2008 | Majewski | ........... | G06F 11/0757 |
| | | | | 714/55 |
| 2009/0204856 A1* | 8/2009 | Sinclair | .............. | G06F 11/0778 |
| | | | | 714/E11.002 |
| 2010/0185833 A1* | 7/2010 | Saito | .................... | G06F 1/3203 |
| | | | | 712/203 |
| 2019/0303303 A1* | 10/2019 | Krishnan | ............ | G06F 12/0833 |
| 2019/0392149 A1* | 12/2019 | Yamashita | .............. | G06F 21/57 |

\* cited by examiner

INFORMATION PROCESSING APPARATUS AND RESET CONTROL METHOD

BACKGROUND OF THE INVENTION

Field of the Invention

The present disclosure is related to an information processing apparatus and a reset control method.

Description of the Related Art

A technique called a watchdog timer (WDT) is used for detecting that a system has stopped operating normally due to a software hang-up or the like and then taking restoration measures such as a system restart (e.g., refer to Japanese Patent Laid-Open No. 2009-053952). Typically, the WDT counts a progression of time on a timer while a system is operating and when a counter value reaches a threshold, deems that an abnormality has occurred in the system and forces the system to reset. While the system is operating normally, a processor that controls the system periodically outputs a control signal to the WDT to initialize the WDT (e.g., clears the counter value to zero). In this manner, while the operation is normal, the WDT counter value does not reach the threshold, and the system is not reset.

A so-called secure boot technology that executes programs to initiate a system after verifying that a system initiation program is valid (e.g., is not falsified) is also known. The secure boot technology is starting to be used on not only general-purpose computers but also devices specialized for specific use such as multifunction peripherals (MFP) and printers. When initiating a system, by verifying validity of a main program as typified by a BIOS (basic input/output system), a safe operation of a system can be ensured. If by any chance the program is determined to be invalid, the system initiation is forced to stop. A program that is determined to be invalid is, for example, overwritten by a valid program for restoration, after which the system can be restarted. Such verification of validity of a program can generally be performed by a supplemental processor rather than a processor that is a main executor of the program.

SUMMARY OF THE INVENTION

In a case where the secure boot technology is adopted in a system comprising a WDT, because a main processor does not start operating until programs are successfully verified, control for preventing a system reset may not be made before a timeout. For example, in a case where it takes a long time to verify or automatically restore when verification fails, even though a system is in a state where it is eventually able to initiate normally, the system may be forced to reset due to a WDT timeout. Such a forced reset prevents the system from initiating.

Accordingly, it is desirable to provide a mechanism that ensures normal system initiation in the case of combining the WDT and the secure boot technology.

According to an aspect, there is provided an information processing apparatus including: a first processor configured to verify a validity of a program; a control circuit configured to issue a system reset signal in a case where there is no access from outside for a predetermined period; and a second processor configured to execute the program that has been determined as valid by the first processor, and to become accessible to the control circuit after the program is initiated. The first processor is configured to access the control circuit before the second processor becomes accessible to the control circuit.

Further features of the present invention will become apparent from the following description of exemplary embodiments (with reference to the attached drawings).

DESCRIPTION OF THE EMBODIMENTS

Figure 1:
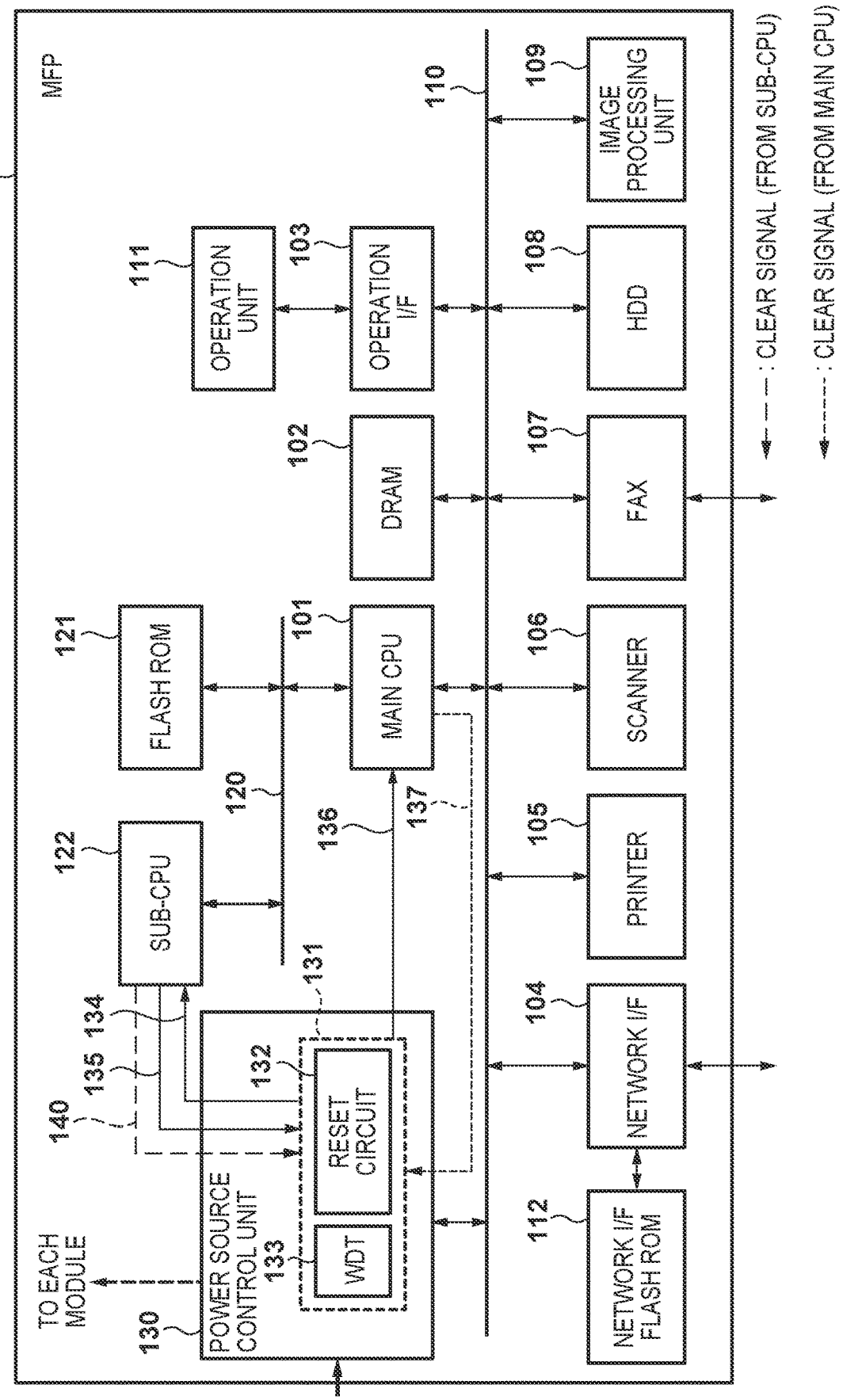
FIG. 1 is a block diagram illustrating an example of a schematic configuration of a multifunction peripheral according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

<<1. Example of Apparatus Configuration>>

<1-1. Overall Configuration>

In this section, an example in which a technology according to the present disclosure is adopted in an MFP is described. However, the technology according to the present disclosure may be adopted not only in the MFP but also in any type of information processing apparatus such as printers, scanners, facsimile machines, PCs (personal computers), tablet devices, or smartphones. Unless otherwise specified, each configuration element described below such as apparatuses, devices, modules, and chips may be composed of a single entity or a plurality of physically different entities.

FIG. 1 is a block diagram illustrating an example of a schematic configuration of a multifunction peripheral 1 according to an embodiment. Referring to FIG. 1, the multifunction peripheral 1 comprises a main CPU 101, a DRAM 102, an operation I/F 103, a network I/F 104, a printer 105, a scanner 106, a FAX 107, an HDD 108, and an image processing unit 109. These configuration elements of the multifunction peripheral 1 are interconnected via a signal bus 110. The operation I/F 103 is connected to an operation unit 111. The network I/F 104 is connected to a network I/F flash ROM 112.

The main CPU (central processing unit) 101 is a processor that controls general functionalities of the multifunction peripheral 1. The DRAM (dynamic random access memory) 102 is a main memory device for the main CPU 101 and temporarily stores programs to be executed by the main CPU 101 and related data. The operation interface (I/F) 103 is an interface that connects the operation unit 111 to the signal bus 110. The operation unit 111 is a unit for providing a user interface for a user to operate the multifunction peripheral 1. The operation unit 111, upon receiving user operations such as pressing of a button or touching of a touch panel, sends a corresponding operation signal to the main CPU 101 via the operation I/F 103. The operation unit 111 also displays, for example, information for operation on a display (not illustrated) screen. The network I/F 104 is an interface for the multifunction peripheral 1 to communicate with external apparatuses. The network I/F 104 may be, for example, a LAN (local area network) interface. The network I/F flash ROM (read only memory) 112 is a non-volatile memory that stores firmware for the network I/F 104 to operate. The printer 105 is a unit for printing an image represented by image data on a sheet. The scanner 106 is a unit that optically reads an original image, converts optical signals to electrical signals, and generates scanned image data. The facsimile (FAX) machine 107 is a unit that is connected to a public network and performs facsimile communication with external facsimile apparatuses. The HDD (hard disk drive) 108 is a so-called secondary storage device. The HDD 108 stores data used by various functions of the multifunction peripheral 1 and programs that do not need to be verified for validity among programs to be executed by the main CPU 101. The HDD 108 may be used as a spool region for spooling print jobs and scan jobs as well as a save region for storing scanned image data for reuse. The image processing unit 109 is a processing module for converting print job image data received via the network I/F 104 to image data suitable for printing by the printer 105. The image processing unit 109 may also execute image processing such as noise removal, color space conversion, rotation, and data compression for scanned image data from the scanner 106. Furthermore, the image processing unit 109 may execute optional image processing on image data stored in the HDD 108.

Referring to FIG. 1, the multifunction peripheral 1 also comprises a flash ROM 121, a sub-CPU 122, and a power source control unit 130. The main CPU 101, the flash ROM 121, and the sub-CPU 122 are interconnected via an SPI (serial peripheral interface) bus 120.

The flash ROM 121 is a storage device for storing one or more programs to be executed by the main CPU 101 and a default setting value for basic settings of the multifunction peripheral 1. The programs stored in the flash ROM 121 comprise, for example, a BIOS program executed when the main CPU 101 is initiated. Some programs (e.g., operating systems (OS) and programs for various applications) to be executed by the main CPU 101 may be stored in storage devices (e.g., the above-described HDD 108) other than the flash ROM 121.

The sub-CPU 122 is a supplemental processor for verifying the validity of programs stored in the flash ROM 121 before they are executed by the main CPU 101. In a case where a program have changed against an intention of the valid developer, the program may be determined to be invalid as a result of verification. On the other hand, in a case where there is no such change, the program may be determined to be valid. For example, in a case where a third party that illicitly accessed the MFP 1 has falsified a program, the program loses its validity. Also, in a case where program data bits have been rewritten due to the apparatus deteriorating over time, the program loses its validity. A method for verifying validity by the sub-CPU 122 will be further described later. The sub-CPU 122, when it determines that a program is valid as a result of the verification, notifies a reset control unit 131, which is later described, of the power source control unit 130 that the verification is complete.

The power source control unit 130 is a unit that controls a supply of power to modules constituting the MFP 1. In the figure, the supply of power from an external commercial AC power supply is illustrated in a bold arrow, and the supply of power to each module in the MFP 1 is simply illustrated in a dashed arrow. The power source control unit 130 is also connected to the signal bus 110, and programs operating on the main CPU 101 are able to access a control register of the power source control unit 130.

The power source control unit 130 further comprises the reset control unit 131 that controls resetting of the main CPU 101 and the sub-CPU 122. In the present embodiment, the reset control unit 131 comprises at least a reset circuit 132 and a watchdog timer (WDT) 133 and in a case where there is no access from outside for a predetermined period, issues a system reset signal. The reset circuit 132 is connected to the sub-CPU 122 via a reset signal line 134 and at least one additional control signal line 135 and is connected to the main CPU 101 via a reset signal line 136.

The reset signal line 134 conveys a reset control signal that is outputted from the reset circuit 132 to the sub-CPU 122. The reset signal line 136 conveys a reset control signal that is outputted from the reset circuit 132 to the main CPU 101. As an example, the reset control signal has two signal levels which are Lo and Hi (e.g., Lo may be an electrical signal level corresponding to zero, and Hi may be an electrical signal level corresponding to 1). The Lo level of the reset control signal means that a CPU, which is an output destination of the signal, should be reset (inactivated), and the Hi level means that the CPU should operate normally.

The reset circuit 132 switches the signal level of the reset control signal outputted to the sub-CPU 122 from Lo to Hi when the MFP 1 is powered on, for example. The sub-CPU 122 interprets this switch as an instruction to release from reset. The sub-CPU 122 starts operation in response to the instruction to release from reset and verifies the validity of the program that are to be executed by the main CPU 101. During this, the reset circuit 132 maintains the signal level of the reset control signal outputted to the main CPU 101 at Lo. The reset circuit 132 switches the signal level of the reset control signal outputted to the main CPU 101 from Lo to Hi when the sub-CPU 122 has completed verifying the program. The main CPU 101 interprets this switch as an instruction to release from reset. The main CPU 101 starts operation in response to the instruction to release from reset and executes the program determined to be valid by the sub-CPU 122.

The WDT 133 continuously counts (i.e., keeps time) time while the MFP 1 is operating. The WDT 133, when a counter value reaches a preset timeout threshold, instructs a system reset to the reset circuit 132. The reset circuit 132, in response to the system reset instruction, outputs a reset control signal whose signal level has been set to Lo to the sub-CPU 122 and the main CPU 101. The sub-CPU 122 and the main CPU 101 are then reset. The sub-CPU 122 and the main CPU 101 are kept in a reset state (inactivated state) for a preset period, and then the sub-CPU 122 is released from the reset state. A reset control signal for triggering such system reset is also called a system reset signal in the present specification. The reset circuit 132 may also output, to other modules constituting the MFP 1, a reset control signal for resetting the respective modules.

The main CPU 101 becomes accessible to the WDT 133 after initiating the programs verified to be valid by the sub-CPU 122. For example, the main CPU 101, while it is operating by executing a valid program, periodically outputs a clear signal 137 to the reset control unit 131 to thereby clear the counter value of the WDT 133. An output cycle of the clear signal 137 is shorter than the above-described timeout threshold for determining the system reset. Accordingly, while the main CPU 101 is operating normally, the system reset is restrained from being executed. If an abnormality occurs in the main CPU 101, this clear signal 137 is no longer outputted to the reset control unit 131, and as a result, the reset control unit 131 responds to the timeout and triggers the system reset. In other words, the reset control unit 131, in a case where the main CPU 101 does not operate for a predetermined period, resets the sub-CPU 122 and the main CPU 101 based on the time kept by the WDT 133. The clear signal 137 may be, for example, a write signal for writing to a predetermined control register of the reset control unit 131 or a pulse signal that uses a pulse to indicate that the counter value should be cleared. The WDT 133, in response to the clear signal 137 being inputted (e.g., in response to detecting a writing to a predetermined control register), clears the counter value to zero and counts time from zero once again.

<1-2. Basic Principle>

As described above, in the present embodiment, by the sub-CPU 122 verifying the validity of a main program of the MFP 1, the MFP 1 is protected from risks such as program falsification and degradation. Additionally, the MFP 1 with the WDT 133, may execute a system reset when an abnormality occurs in the system and automatically restore a normal state. However, until the sub-CPU 122 has completed verifying the program, the main CPU 101 neither starts operation nor outputs the clear signal 137 to the reset control unit 131. Therefore, in a case where it takes a long time for the sub-CPU 122 to verify the program, even though a system is in a state where it is eventually able to initiate normally, the counter value may reach the timeout threshold in the WDT 133 and a system reset may be executed. In such a case, because the program validity verification is redone from the start after the system is reset, the system initiation is prolonged. Not only that, but another system reset may be performed in the middle of the reverification, which could result in a situation where the MFP 1 cannot be initiated indefinitely. Also, in a case where the sub-CPU 122 comprises a function to carry out restoration using a restoration version of a program when verification fails, there is a risk that a copy of the restoration version may get damaged due to stopping in the middle of writing the restoration version onto the flash ROM 121.

In order to avoid/resolve the above inconveniences, a method in which, for example, the WDT 133 is stopped from keeping time until the sub-CPU 122 completes verifying the validity of the program is conceivable. However, with such a method, in a case where an abnormality occurs in the sub-CPU 122 for some reason, the system reset is not executed, and the MFP 1 is prevented from being restored to a normal state. Another method in which, for example, the timeout threshold of the WDT 133 is set to a value large enough to cover the processing time it takes to verify the validity of the program (and to restore the program when verification fails) can be conceived. However, if the timeout threshold were uniformly extended, then the reset of the main CPU 101 may be delayed when abnormalities occur. Also, if different timeout thresholds were to be maintained for the sub-CPU 122 and the main CPU 101, the timer circuit scale increases, and the cost of the apparatus becomes comparatively expensive despite this being preparation for a phenomenon that rarely occurs.

Thus, in the present embodiment, the sub-CPU 122 is made to access the WDT 133 before the main CPU 101 becomes accessible to the WDT 133. More specifically, the sub-CPU 122 outputs a clear signal 140 to the reset control unit 131 before the programs (that are to be executed by the main CPU 101) are successfully verified to clear the counter value of the WDT 133, for example. The clear signal 140 may be outputted periodically, and its output cycle is shorter than the above-described timeout threshold for determining the system reset. The clear signal 140 may be, for example, a pulse signal that has a fixed cycle, a write signal that writes to a predetermined control register, or a command signal that represents a predetermined control command. The sub-CPU 122 may use an internal counter or timer to synchronize transmission of a pulse of the clear signal 140 with an output cycle shorter than the above timeout threshold. Such a configuration makes it possible to prevent an unintended system reset from being executed while the sub-CPU 122 is verifying the validity of (or restoring) a program before the main CPU 101 starts operation. From the next section, a configuration of each unit for achieving the principle described here will be described in detail.

<<2. Details of Respective Units>>

<2-1. Configuration Example of Main CPU>

Figure 2:
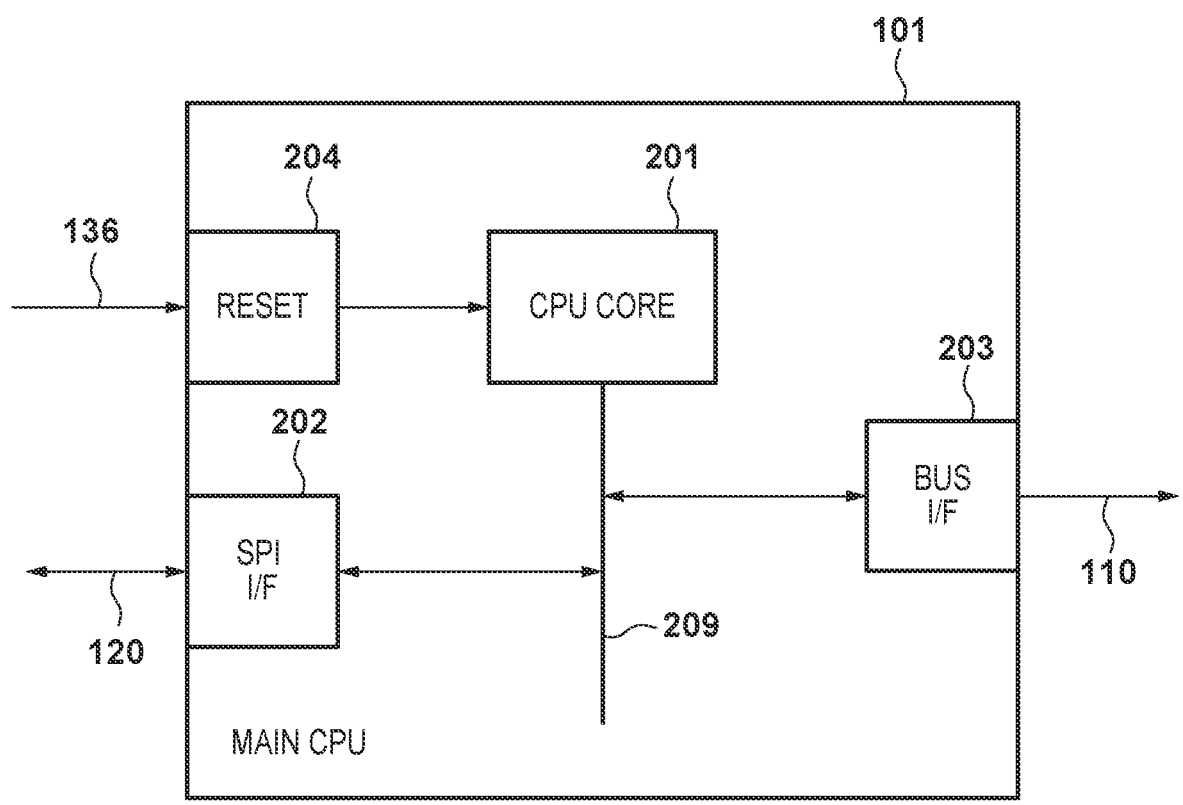
FIG. 2 is a block diagram illustrating an example of a detailed configuration of a main CPU according to an embodiment.

FIG. 2 is a block diagram illustrating an example of a detailed configuration of the main CPU 101 according to the present embodiment. The main CPU 101 comprises a CPU core 201, an SPI I/F 202, a bus I/F 203, a reset terminal 204, and a CPU signal bus 209.

The CPU core 201 is a processor core that executes operations for carrying out functionalities of the main CPU 101. The SPI I/F 202 is an interface (also called an SPI master) for a communication between the main CPU 101 and other SPI devices via an SPI bus 120. The bus I/F 203 is an interface for communication between the main CPU 101 and other modules via the signal bus 110. The reset terminal 204 is a terminal that receives the reset control signal inputted from the reset circuit 132 via the reset signal line 136. The CPU signal bus 209 interconnects the CPU core 201, the SPI I/F 202, and the bus I/F 203.

In the present embodiment, immediately after the MFP 1 is powered on, a level of the reset control signal received by the reset terminal 204 is Lo, and the main CPU 101 is maintained in a reset state (inactivated state). During that, the validity of the program is verified by the sub-CPU 122. In a case where the sub-CPU 122 determines that the program is valid, the reset control signal level switches to Hi, and the CPU core 201 starts its operation. At the beginning of that operation, the CPU core 201 reads a program stored in a predetermined address in the flash ROM 121 (and determined to be valid by the sub-CPU 122) to the DRAM 102 via the SPI bus 120 and then executes the read program. In the present embodiment, the program to be executed by the main CPU 101 may comprise at least a BIOS program of the MFP 1. For example, the main CPU 101, after executing the BIOS program to initialize an input/output functions of the main CPU 101, executes programs such as an OS, respective module drivers and other applications to start a normal operation of the MFP 1. The main CPU 101, during its operation, outputs the clear signal 137 to the reset control unit 131 via the signal bus 110 at an output cycle that is shorter than the above-described timeout threshold to clear the counter value of the WDT 133. Accordingly, while the MFP 1 is operating normally, the system reset is restrained.

<2-2. Configuration Example of Sub-CPU>

Figure 3:
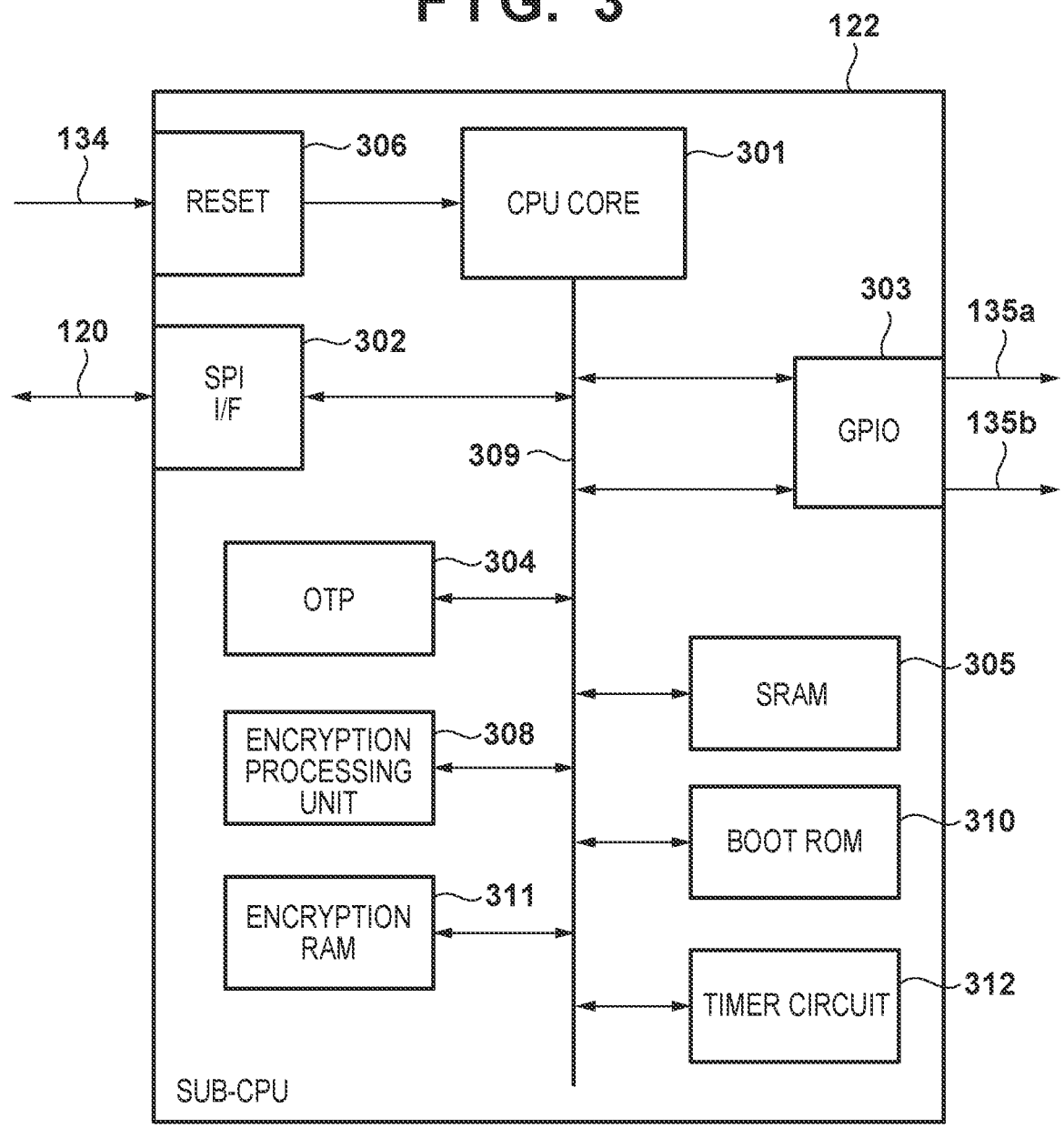
FIG. 3 is a block diagram illustrating an example of a detailed configuration of a sub-CPU according to an embodiment.

FIG. 3 is a block diagram illustrating an example of a detailed configuration of the sub-CPU 122 according to the present embodiment. The sub-CPU 122 comprises a CPU core 301, an SPI I/F 302, a general-purpose input/output terminal 303, a OTP 304, an SRAM 305, a reset terminal 306, an encryption processing unit 308, a signal bus 309, a boot ROM 310, an encryption RAM 311, and a timer circuit 312.

The CPU core 301 is a processor core that executes operations for carrying out functionalities of the sub-CPU 122. The SPI I/F 302 is an interface (also called an SPI master) for a communication between the sub-CPU 122 and other SPI devices via an SPI bus 120. A general-purpose input/output terminal (GPIO) 303 is a terminal to which the control signal line 135 is connected for use in communication of the sub-CPU 122 with the reset control unit 131. In an example in FIG. 3, two control signal lines 135a and 136b are illustrated. For example, in a case where a program is successfully verified, the first control signal line 135a conveys a verification completion notification signal which is outputted from the sub-CPU 122 to the reset control unit 131. The second control signal line 135b conveys the above-described clear signal 140. Note that these signals may alternatively be conveyed in a single common signal line. OTP (one time programmable) 304 is a memory region to which writing can only be done once during production and in which rewriting is not possible. In the present embodiment, an encrypted hash value (i.e., a signature), which is a hash value of the sub-CPU 122 firmware encrypted with a private key of a public key encryption method, and a later-described Tag address may be written on the OTP 304 in advance. The SRAM 305 is a so-called cache memory of the sub-CPU 122 and may be used by the CPU core 301 as a calculation work memory. The reset terminal 306 is a terminal that receives the reset control signal inputted from the reset circuit 132 via the reset signal line 134. The encryption processing unit 308 is a processor dedicated for encryption-related processing, which facilitates signature verification by the sub-CPU 122. For example, the encryption processing unit 308, by decrypting the sub-CPU 122 firmware and main CPU 101 program signatures, restores their respective valid hash value. The encryption processing unit 308 may also perform a hash calculation for deriving hash values from program data. The signal bus 309 interconnects the CPU core 301, the SPI I/F 302, the GPIO 303, the OTP 304, the SRAM 305, the encryption processing unit 308, the boot ROM 310, the encryption RAM 311, and the timer circuit 312. The boot ROM 310 is a storage device that stores the sub-CPU 122 boot program (also called a boot code) in advance. The encryption RAM 311 is a memory dedicated for encryption-related processing that temporarily stores data requiring high-level confidentiality, which is processed by the encryption processing unit 308. The timer circuit 312 is a circuit that keeps time while the sub-CPU 122 is operating.

In the present embodiment, when the MFP 1 is powered on, the level of the reset control signal that the reset terminal 306 receives switches from Lo to Hi, and the CPU core 301 starts its operation. At the beginning of that operation, the CPU core 301 read its own boot program from the boot ROM 310 to the SRAM 305 and then executes the read boot program. The CPU core 301 also reads one or more programs that are to be verified for validity from the flash ROM 121 and then verifies the validity of the read programs. In the present embodiment, the programs that are to be verified for validity comprise at least the BIOS program of the MFP 1. Furthermore, the programs that are to be verified for validity may comprise firmware for the sub-CPU 122 to operate.

Figure 4:
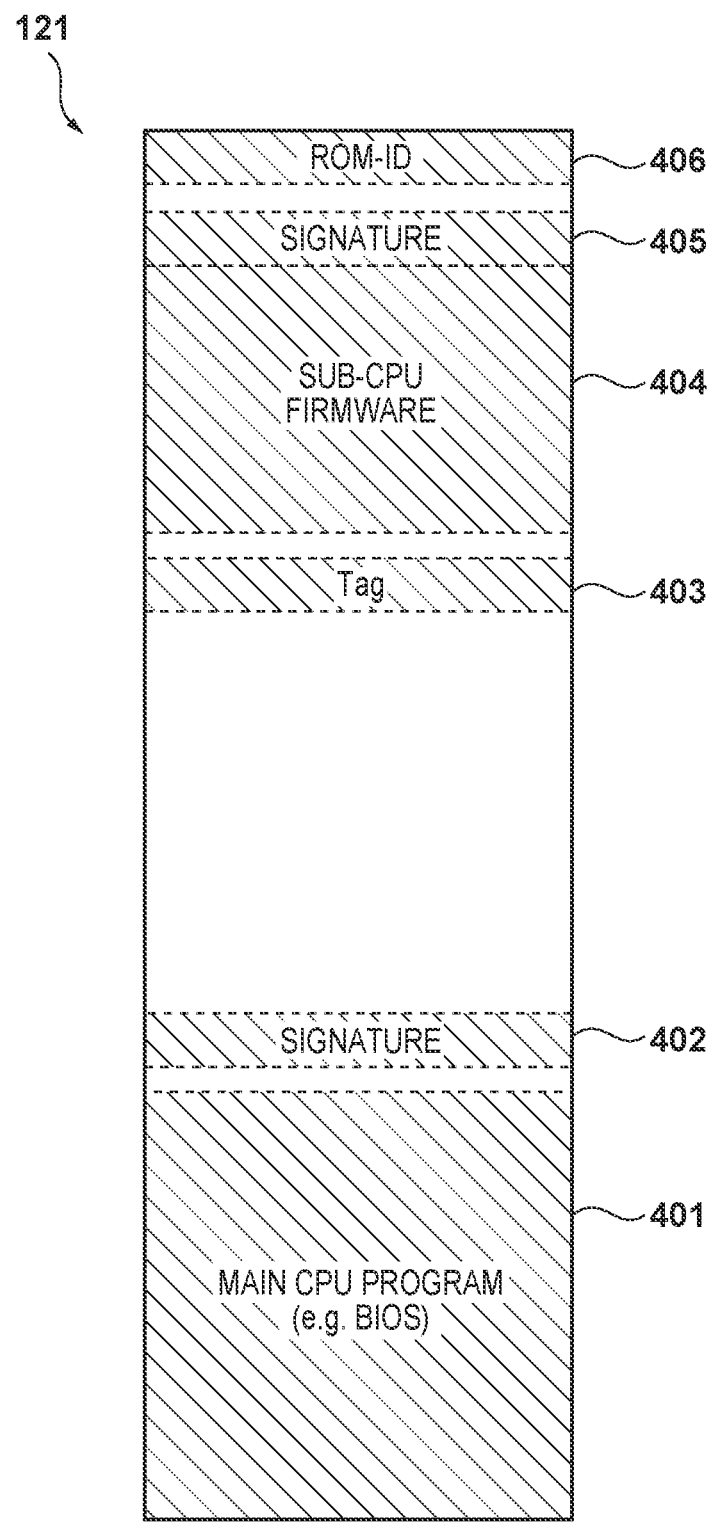
FIG. 4 is an explanatory diagram illustrating an example of a flash ROM memory map according to an embodiment.

FIG. 4 is an explanatory diagram illustrating an example of the flash ROM 121 memory map according to the embodiment. As illustrated in FIG. 4, the flash ROM 121 stores a main CPU program 401, a signature 402, a Tag 403, a sub-CPU firmware 404, a signature 405, and a ROM-ID 406 in advance. The main CPU program 401 is, for example, a BIOS program that is executed when the main CPU 101 is booted. The signature 402 is a signature (for example, an RSA signature) for verifying the validity of the main CPU program 401. The signature 402 is derived in advance by having a hash value of the (valid) main CPU program 401 encrypted, and may be stored in the flash ROM 121. The Tag 403 is data that indicates a leading address of a storage area in which the sub-CPU firmware 404 is stored. An address of the Tag 403 is stored in the OTP 304 as described above. The sub-CPU firmware 404 is firmware that includes program codes to be executed by the CPU core 301. The signature 405 is a signature (for example, an ECDSA signature) for verifying the validity of the sub-CPU firmware 404. The signature 405 is derived in advance based on an entire or a specific leading portion of the (valid) sub-CPU firmware 404, and may be stored in the flash ROM 121. The ROM-ID 406 is data that includes the leading address of a storage area in which the main CPU program 401 is stored, the size of the storage area, and the address of the signature 402.

In FIG. 4, an example in which only one set of the program and signature for the main CPU is stored in the flash ROM 121 is illustrated. However, the flash ROM 121 is not limited to this and may store a plurality of sets of programs and signatures for the main CPU. Similarly, in FIG. 4, an example in which only one set of firmware and signature for the sub-CPU is stored in the flash ROM 121 is illustrated. However, the flash ROM 121 is not limited to this and may store a plurality of sets of firmware and signatures for the sub-CPU. Herein, though an example in which the signature 402 is the RSA signature and the signature 405 is the ECDSA signature has been explained for instance, each signature may be based on any kind of digital signature method such as an RSA signature, a DSA signature, or an ECDSA signature.

In the present embodiment, while the program validity is being verified, the CPU core 301 of the sub-CPU 122 outputs the clear signal 140 to the reset control unit 131 via the GPIO 303 at an output cycle that is shorter than the above-described timeout threshold. The output cycle of the clear signal 140 may be controlled, for example, according to the time kept by the timer circuit 312. Accordingly, the system reset is prevented. The timer circuit 312, similarly to a free run timer, may count periodically from zero to an upper limit value (that corresponds to the clear signal output cycle) without stopping. Alternatively, the timer circuit 312 may stop counting when the counter value reaches the upper limit value, and the timer circuit 312 may resume counting after the clear signal 140 is outputted. Note that, instead of the timer circuit 312, a software timer that operates on the CPU core 301 may be used.

Once all the programs that are to be verified have been determined to be valid based on a digital signature scheme as described using FIG. 4, the CPU core 301 stops periodic output of the clear signal 140. At the same time, the CPU core 301 outputs a verification completion notification signal to the reset control unit 131 via the GPIO 303. In response to that, the main CPU 101 may be released from resetting as described above.

<2-3. Configuration Example of Reset Control Unit>

Figure 5:
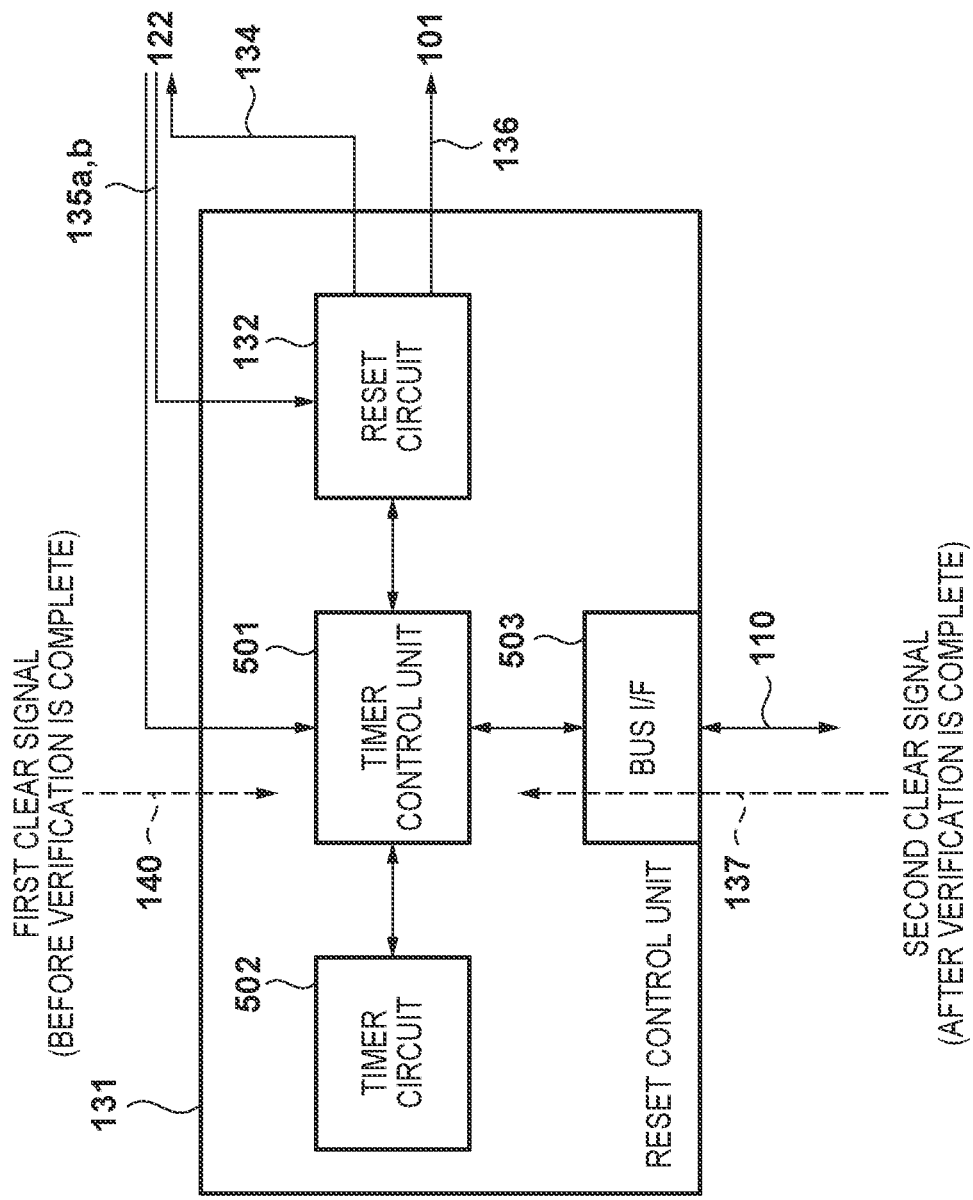
FIG. 5 is a block diagram illustrating an example of a detailed configuration of a reset control unit according to an embodiment.

FIG. 5 is a block diagram illustrating an example of a detailed configuration of the reset control unit 131 according to the present embodiment. The reset control unit 131 comprises the reset circuit 132, a timer control unit 501, a timer circuit 502, and a bus I/F 503. The timer control unit 501 and the timer circuit 502 comprises the WDT 133 illustrated in FIG. 1.

The timer control unit 501 is a controller that determines a timeout based on the time kept by the timer circuit 502, and clears the counter value of the timer circuit 502. The timer circuit 502 is a circuit that increments the counter value as time elapses. The bus I/F 503 is an interface for communication between the reset control unit 131 and other modules via the signal bus 110.

The timer circuit 502, in response to power supply being started to the reset control unit 131 or a reset being released, initializes the counter value to zero, and starts timekeeping. The timer control unit 501 monitors the counter value of the timer circuit 502, and in a case where the counter value has reached a preset timeout threshold, determines that the timeout has occurred. If it is determined that the timeout has occurred, the timer control unit 501 outputs a timeout signal for instructing a system reset to the reset circuit 132. The timer control unit 501, after outputting the timeout signal, clears the counter value of the timer circuit 502 to zero, and causes the timer circuit 502 to resume counting.

Also, the timer control unit 501, when a clear signal is inputted from the main CPU 101 or the sub-CPU 122, clears the counter value of the timer circuit 502 to zero. The clear signals, as described above, may be realized in any manner such as pulses of a pulse signal, or a writing of a control value to a predetermined control address. In the present embodiment, while the program is being verified for validity by the sub-CPU 122, the clear signal 140 may be inputted periodically from the sub-CPU 122 to the timer control unit 501. If it is determined that the program is valid by the sub-CPU 122, the reset circuit 132 releases the main CPU 101 from reset in response to the verification completion notification signal being inputted. Thereafter, inputs of the clear signal 140 from the sub-CPU 122 stop and the clear signal 137 may be inputted periodically from the main CPU 101 to the timer control unit 501, instead. In a case where these clear signals have not been inputted over a period represented by the above-described timeout threshold, the counter value reaches the timeout threshold without being cleared. Then, the timer control unit 501 deems that some sort of an abnormality has occurred in the system, and outputs the timeout signal to the reset circuit 132. The timer control unit 501 may be triggered by the verification completion notification signal input to start monitoring a second clear signal (e.g., monitoring a value indicated by a predetermined control register) from the main CPU 101.

<<3. Processing Flow>>

<3-1. Processing when Starting System>

Figure 6:
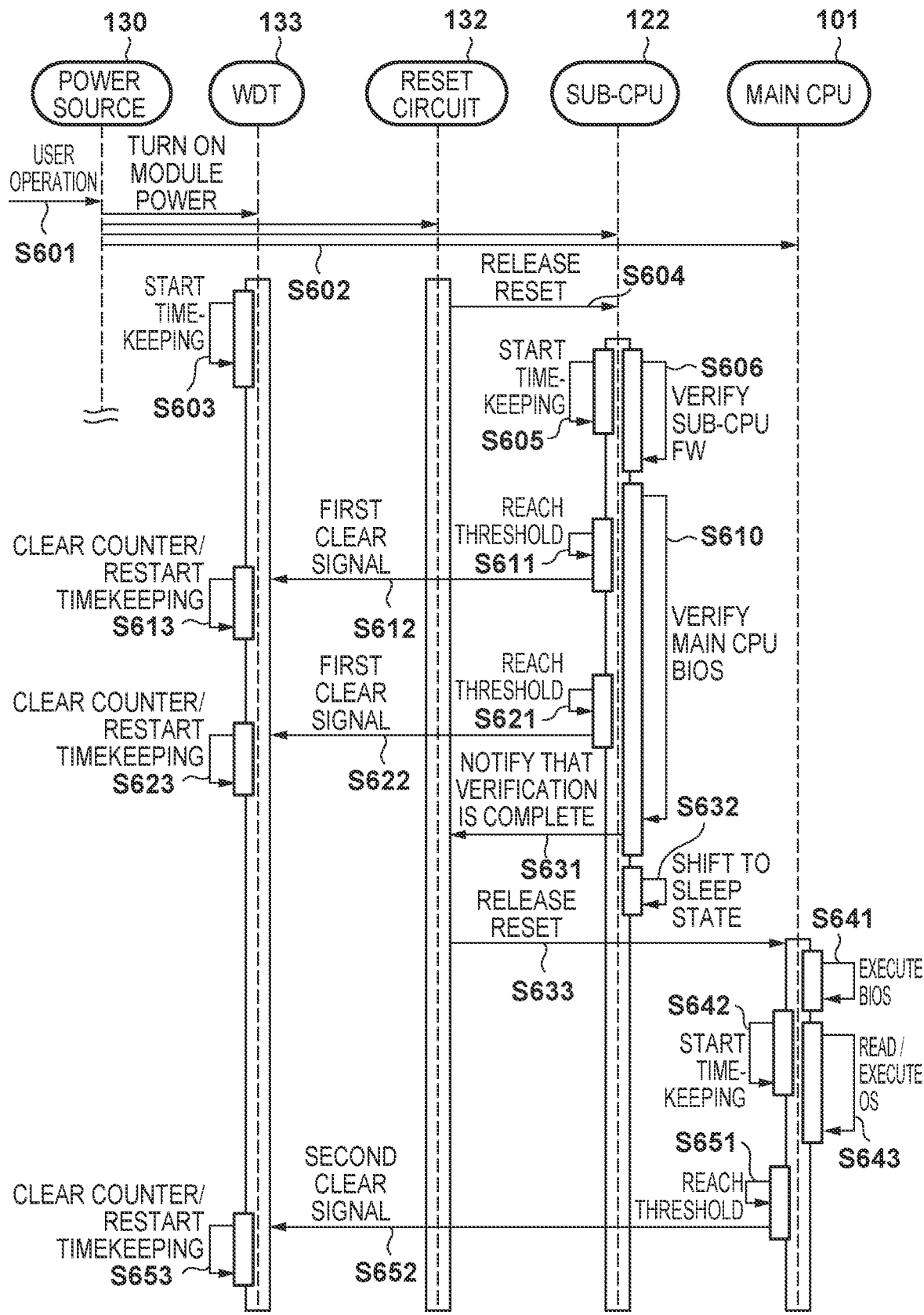
FIG. 6 is a sequence diagram illustrating an example of a schematic flow of processing at a time of system startup according to an embodiment.

FIG. 6 is a sequence diagram illustrating an example of a schematic flow of processing at the time of starting the system in the MFP 1 according to the embodiment. In addition to a user who operates the MFP 1, the power source control unit 130, the WDT 133, the reset circuit 132, the sub-CPU 122, and the main CPU 101 of the MFP 1 are involved in processing illustrated in FIG. 6. Note that 'S (Step)' in the following descriptions is an abbreviation of 'process step'.

First, in step S601, the power source control unit 130 receives a user operation for initiating the MFP 1 via the operation unit 111. In response to this user operation, in step S602, the power source control unit 130 starts distributing power supplied from a commercial AC power supply to each module. The reset circuit 132 outputs the reset control signal indicating a Lo level to the sub-CPU 122 and the main CPU 101.

In step S603, the WDT 133, in response to a start of the power supply, starts keeping time using the timer circuit 502. Also, in step S604, the reset circuit 132 switches the signal level of the reset control signal outputted to the sub-CPU 122 to Hi to release the sub-CPU 122 from reset.

In step S605, the sub-CPU 122, in response to the reset release, starts keeping time using the timer circuit 312. Concurrently, in step S606, the sub-CPU 122 verifies a validity of the sub-CPU firmware 404. Here, it is assumed that the sub-CPU firmware 404 is determined to be valid. Next, in step S610, the sub-CPU 122 verifies a validity of the main CPU program 401 (e.g., a BIOS program).

While the sub-CPU 122 is verifying the validity of the programs in this way, in step S611, the counter value of the timer circuit 312 may reach a threshold that represents the output cycle of the first clear signal. Then, in step S612, the sub-CPU 122 outputs the first clear signal to the WDT 133 (the counter value of the timer circuit 312 may be cleared here). In step S613, the WDT 133, after clearing the counter value of the timer circuit 502 in response to the first clear signal being inputted, resumes timekeeping using the timer circuit 502.

In an example in FIG. 6, a verification of the validity of the main CPU program 401 by the sub-CPU 122 is further continued. In step S621, the counter value of the timer circuit 312 may once again reach the threshold that represents the output cycle of the first clear signal. Then, in step S622, the sub-CPU 122 outputs the first clear signal to the WDT 133 (the counter value of the timer circuit 312 may be cleared here). In step S623, the WDT 133, after clearing the counter value of the timer circuit 502 in response to the first clear signal being inputted, resumes timekeeping using the timer circuit 502.

At some point, a verification of the validity of the main CPU program 401 by the sub-CPU 122 ends. Here, it is assumed that the main CPU program 401 is also determined to be valid. Then, in step S631, the sub-CPU 122 outputs the verification completion notification signal to the reset circuit 132. Then, in step S632, the sub-CPU 122 shifts to a sleep state.

In step S633, the reset circuit 132, in response to the verification completion notification signal being asserted, switches the signal level of the reset control signal outputted to the main CPU 101 to Hi to release the main CPU 101 from reset.

In step S641, the main CPU 101, in response to the reset release, executes the main CPU program 401 (e.g., a BIOS program) read from the flash ROM 121. Also, in step S642, the main CPU 101 starts timekeeping. Here, the main CPU 101 is assumed to use a software timer. In step S643, the main CPU 101 initiates the OS by executing the OS program read from the HDD 108. Although not illustrated in FIG. 6, in response to the OS being initiated, respective module drivers and other applications may also be initiated.

While the main CPU 101 is executing the programs in this way, in step S651, the counter value of the timer may reach a threshold that represents the output cycle of the second clear signal. Then, in step S652, the main CPU 101 outputs a second clear signal to the WDT 133. In step S653, the WDT 133, after clearing the counter value of the timer circuit 502 in response to the second clear signal being inputted, resumes timekeeping using the timer circuit 502.

In such a sequence, for example, in a case where an abnormality occurs in the sub-CPU 122 before step 631 and a periodic output of the first clear signal is stopped, the timer circuit 502 of the WDT 133 may time out due to the counter value not being cleared. Also, in a case where an abnormality occurs in the main CPU 101 after step S641 and a periodic output of the second clear signal is stopped, the timer circuit 502 of the WDT 133 may also time out due to the counter value not being cleared. Once a timeout occurs in the WDT 133, the timer control unit 501 of the WDT 133 instructs a system reset to the reset circuit 132, and the reset circuit 132, in response thereto, causes the main CPU 101 and the sub-CPU 122 to reset. For example, the main CPU 101 and the sub-CPU 122 are kept in a reset state over a preset period, after which the sub-CPU 122 reset is released, and then processing steps described above from step S604 onward are re-executed.

<3-2. Processing by Sub-CPU>

Figure 7:
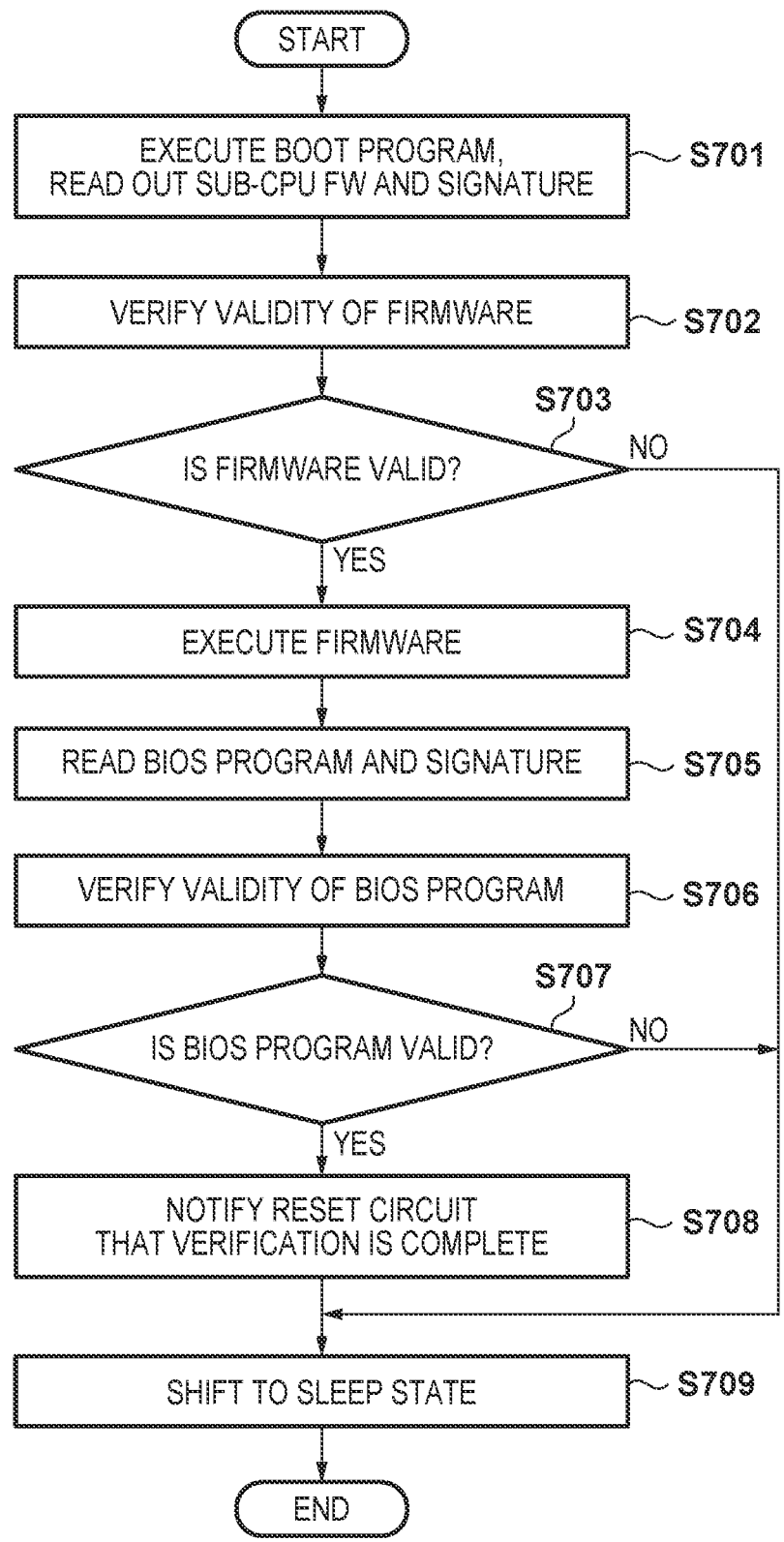
FIG. 7 is a flowchart illustrating an example of a flow of processing executed by the sub-CPU according to an embodiment.

FIG. 7 is a flowchart illustrating an example of a flow of processing executed by the sub-CPU 122 according to the embodiment.

First, in step S701, immediately after initiation, the sub-CPU 122 reads a boot program from the boot ROM 310 and executes the read boot program. Accordingly, the sub-CPU firmware 404 and the signature 405 are read from the flash ROM 121 to the SRAM 305 via the SPI bus 120.

Next, in step S702, the sub-CPU 122 verifies the validity of the sub-CPU firmware 404. For example, the encryption processing unit 308 decrypts the signature 405 using a public key prestored in the OTP 304 to derive a valid hash value for the sub-CPU firmware 404. Also, the encryption processing unit 308 calculates a hash value from program data of the sub-CPU firmware 404. In a case where these hash values match each other, the sub-CPU firmware 404 is determined to be valid (is neither falsified nor changed due to aging). On the other hand, in a case where the hash values do not match, because the sub-CPU firmware 404 has changed against a developer's intent, it is determined to be invalid.

Subsequently, the processing branches in step S703, depending on a result of the validity verification of the sub-CPU firmware 404. In a case where the sub-CPU firmware 404 is determined to be valid, the processing advances to step S704. On the other hand, in a case where the sub-CPU firmware 404 is not determined to be valid, the processing advances to step S709.

In step S704, the sub-CPU 122 reads the sub-CPU firmware 404 to the SRAM 305 and executes it. Next, in step S705, the sub-CPU 122 operates in accordance with the sub-CPU firmware 404 and, based on an address deriving from the ROM-ID 406, reads a BIOS program 401 and the signature 402 from the flash ROM 121 to the SRAM 305. Next, in step S706, the sub-CPU 122 verifies the validity of the BIOS program 401. For example, the encryption processing unit 308 decrypts the signature 402 using a public key to derive a valid hash value of the BIOS program 401. Also, the encryption processing unit 308 calculates a hash value from program data of the BIOS program 401. In a case where these hash values match each other, the BIOS program 401 is determined to be valid (is neither falsified nor changed due to aging). On the other hand, in a case where the hash values do not match, because the BIOS program 401 has changed against a developer's intent, it is determined to be invalid.

Subsequent processing branches in step S707, depending on a result of the validity verification of the BIOS program 401. In a case where the BIOS program 401 is determined to be valid, the processing advances to step S708. In step S708, the sub-CPU 122 notifies the reset control unit 131 that the verification is complete by controlling the GPIO 303 to assert the verification completion notification signal. Then, the processing advances to step S709. On the other hand, in a case where the BIOS program 401 is determined to be invalid, step S708 will not be executed, and the processing advances to step S709.

While the above-described steps S702 to S708 are being executed, the sub-CPU 122 continues to periodically output the first clear signal to the reset control unit 131. Specifically, the timer circuit 312 is first initiated by the sub-CPU 122. The GPIO 303 port is initialized and, for example, the verification completion notification signal level is set to Lo. Then, by the timer circuit 312 incrementing the counter value, the timer progresses.

The sub-CPU 122 determines, for example, based on an interruption from the timer circuit 312, whether the output cycle of the first clear signal has elapsed. In a case where the output cycle of the first clear signal has elapsed, the sub-CPU 122 controls the GPIO 303 to output the first clear signal to the reset control unit 131 and clears the counter value of the timer circuit 312.

In step S709, the sub-CPU 122 shifts to a sleep state in order to save power. In the sleep state, the sub-CPU 122 does not output (or assert) the first clear signal. The sleep state of the sub-CPU 122 may be maintained until the MFP 1 system reset is executed. Alternatively, in order to reuse the sub-CPU 122 for purposes other than verifying the validity of programs, the sub-CPU 122 may not be shifted to a sleep state, or the sub-CPU 122 that has once shifted to a sleep state can return to a normal state (e.g., in response to an interruption signal).

In an example illustrated in FIG. 7, in a case where the sub-CPU 122 has failed to verify the validity of programs, it immediately shifts to a sleep state in step S709. As a result, clear signals are no longer inputted to the reset control unit 131, leading to the WDT timeout, and the sub-CPU 122 and the main CPU 101 are reset. According to such a configuration, the program code of the sub-CPU firmware 404 can be minimized. In a case where the sub-CPU 122 shifts to a sleep state in step S709 via step S708, because the main CPU 101 outputs the second clear signal to the reset control unit 131, unless an abnormality occurs in the main CPU 101, a system reset will not be performed.

<3-3. Processing by Main CPU>

Figure 8:
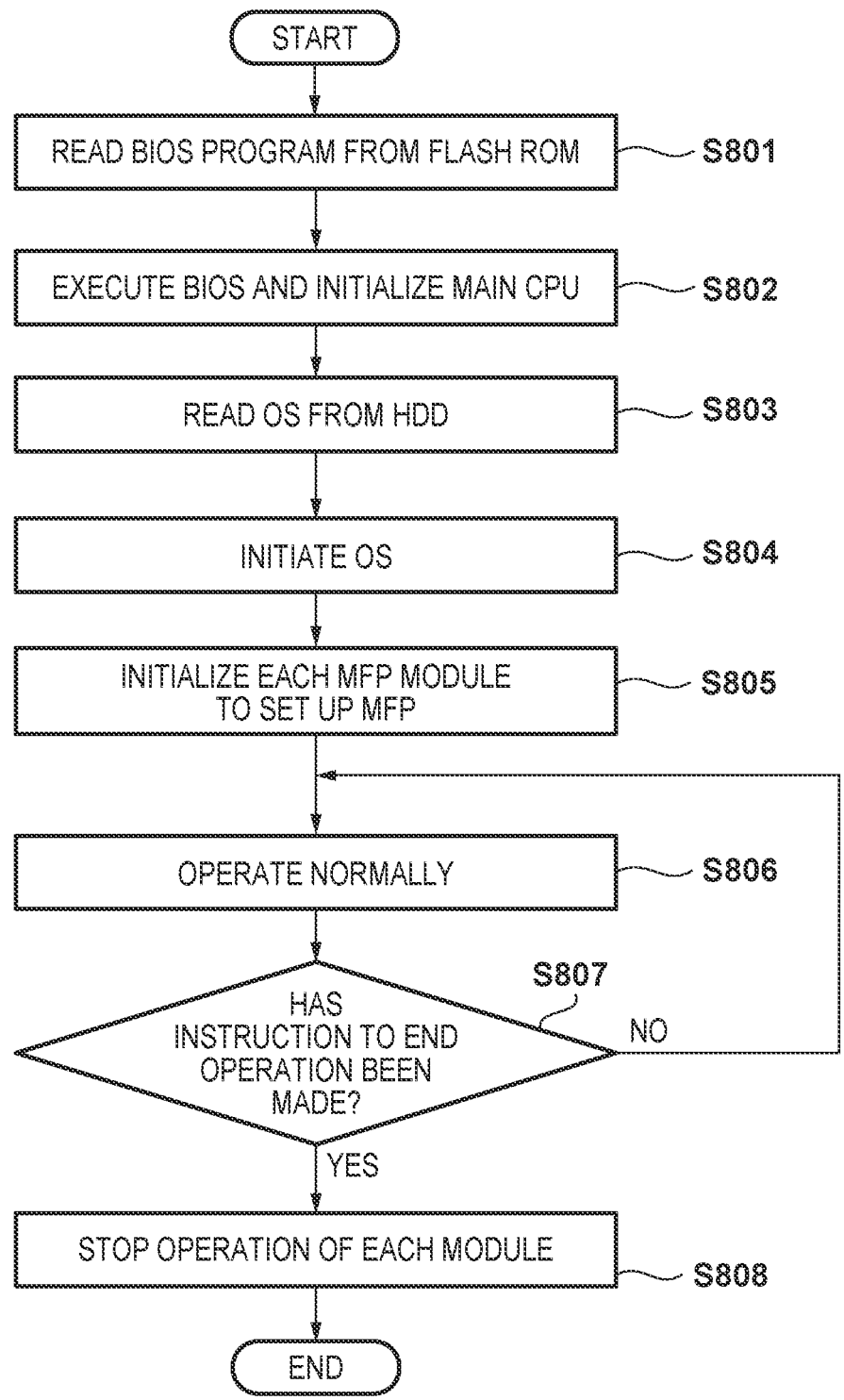
FIG. 8 is a flowchart illustrating an example of a flow of processing executed by the main CPU according to an embodiment.

FIG. 8 is a flowchart illustrating an example of a flow of processing executed by the main CPU 101 according to the embodiment.

First, in step S801, in response to being released from reset, the main CPU 101 reads the BIOS program from the flash ROM 121 to the DRAM 102. Next, in step S802, the main CPU 101 executes the read BIOS program. Accordingly, the basic input/output functions of the main CPU 101 are initialized.

Next, in step S803, the main CPU 101 reads programs constituting the OS from the HDD 108 to the DRAM 102. Next, in step S804, the main CPU 101, by executing the read programs, initiates the OS of the MFP 1. Next, in step S805, the main CPU 101 initializes respective modules of the MFP 1 (e.g., the operation I/F 103, the network I/F 104, the printer 105, the scanner 106, the FAX 107, and the image processing unit 109) to set up the MFP 1. As a result of that, in step S806, the MFP 1 is able to operate normally. The operation of the MFP 1 is continued until an end of the operation of the MFP 1 is instructed, for example, via a user operation (S807).

While the above-described steps S802 to S806 are being executed, the main CPU 101 continues to periodically output the second clear signal to the reset control unit 131. Specifically, the software timer is first initiated by the main CPU 101. The software timer progresses by incrementing the counter value which is an internal variable. The main CPU 101, when it is determined that the output cycle of the second clear signal has elapsed, outputs the second clear signal to the reset control unit 131 to write a predetermined value (e.g., "1") to a control register (e.g., a WDT clear register) of the reset control unit 131. At the same time, the main CPU 101 clears the counter value of the software timer. In step S808, in a case where the MFP 1 operation is ended (or in a case where some sort of an abnormality has occurred to the main CPU 101), output of the second clear signal is stopped.

<3-4. Processing by WDT>

Figure 9:
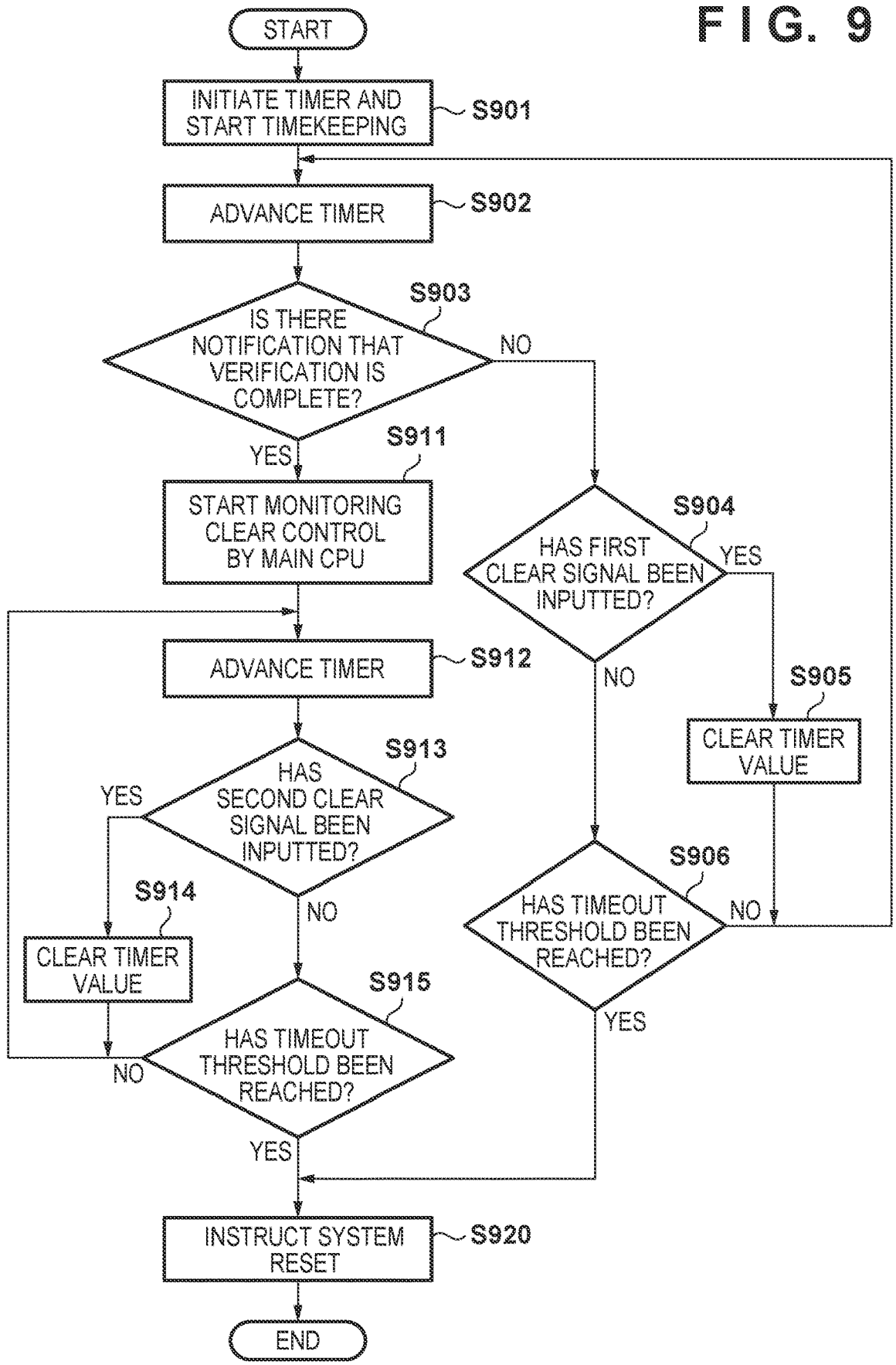
FIG. 9 is a flowchart illustrating an example of a flow of processing executed by a WDT according to an embodiment.

FIG. 9 is a flowchart illustrating an example of a flow of processing executed by the WDT 133 according to the embodiment.

First, in step S901, in response to the start of the power supply, the WDT 133 initiates the timer circuit 502 and causes the timer circuit 502 to start keeping time. In step S902, the timer progresses, in other words, the timer circuit 502 increments the counter value. The WDT 133, in step S903, awaits notification from the sub-CPU 122 that the verification has been completed.

Until the sub-CPU 122 notifies that the verification has been completed, the WDT 133, in step S904, monitors the first clear signal being inputted from the sub-CPU 122. In a case where the first clear signal is inputted from the sub-CPU 122, the WDT 133, in step S905, clears the counter value of the timer circuit 502 and causes the timekeeping to be restarted from zero. Then, the processing returns to step S902. In a case where the first clear signal is not inputted from the sub-CPU 122, the WDT 133, in step S906, determines whether the counter value of the timer circuit 502 has reached the timeout threshold. In a case where the counter value has not reached the timeout threshold, the processing returns to step S902. In a case where the counter value has reached the timeout threshold, the processing advances to step S920.

When the sub-CPU 122 notifies that the verification has been completed, the WDT 133, in step S911, starts monitoring clear control by the main CPU 101. In step S912, the timer continues to advance. In step S913, the WDT 133 monitors the input (e.g., a writing to the WDT clear register) of the second clear signal from the main CPU 101. In a case where the second clear signal is inputted from the main CPU 101, the WDT 133, in step S914, clears the counter value of the timer circuit 502 and causes the timekeeping to be restarted from zero. Then, the processing returns to step S912. In a case where the second clear signal is not inputted from the main CPU 101, the WDT 133, in step S915, determines whether the counter value of the timer circuit 502 has reached the timeout threshold. In a case where the counter value has not reached the timeout threshold, the processing returns to step S912. In a case where the counter value has reached the timeout threshold, the processing advances to step S920.

In step S920, the WDT 133 deems that an abnormality has occurred in the MFP 1 (the sub-CPU 122 or the main CPU 101), and instructs a system reset to the reset circuit 132.

<3-5. Processing by Reset Circuit>

Figure 10:
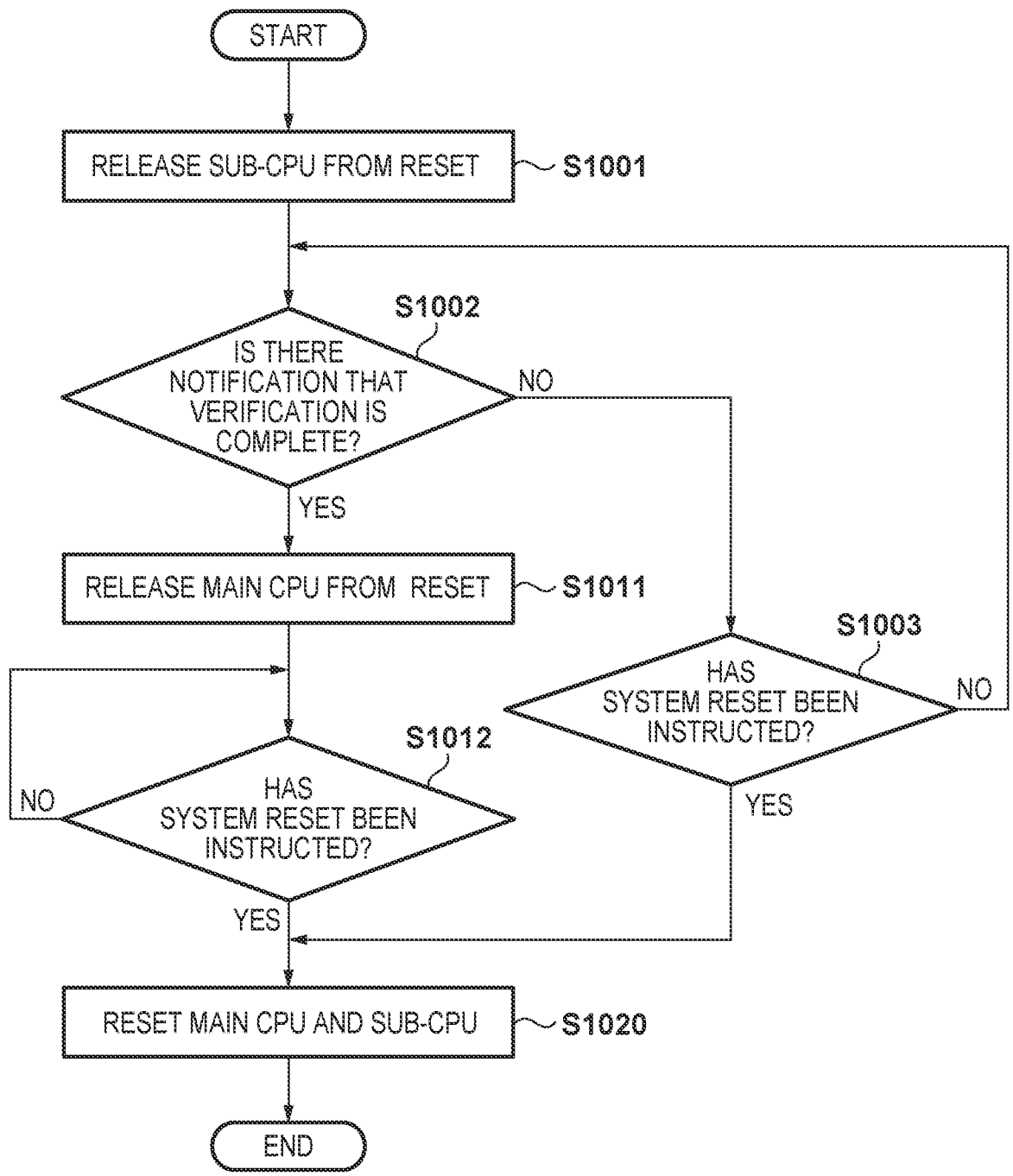
FIG. 10 is a flowchart illustrating an example of a flow of processing executed by a reset circuit according to an embodiment.

FIG. 10 is a flowchart illustrating an example of a flow of processing executed by the reset circuit 132 according to the embodiment.

First, in step S1001, in response to the start of the power supply, the reset circuit 132 releases the sub-CPU 122 from reset. Next, in step S1002, the reset circuit 132 awaits notification from the sub-CPU 122 that the verification has been completed. In a case where there is no notification from the sub-CPU 122 that the verification has been completed, in step S1003, the reset circuit 132 determines whether a system reset has been instructed from the WDT 133. In a case where a system reset has been instructed, the processing advances to step S1020. On the other hand, in a case where a system reset has not been instructed, the processing returns to step S1002.

In a case where there is notification from the sub-CPU 122 that the verification has been completed, in step S1011, the reset circuit 132 releases the main CPU 101 from reset. Next, in step S1012, the reset circuit 132 awaits a system reset instruction from the WDT 133. In a case where a system reset has been instructed, the processing advances to step S1020.

In step S1020, because the system reset has been instructed (e.g., a timeout signal has been inputted) from the WDT 133, the reset circuit 132 resets (issues a system reset signal to) the main CPU 101 and the sub-CPU 122.

According to the reset control as described using FIGS. 9 and 10, unnecessary system resets can be prevented from being executed in response to the WDT timeout while the sub-CPU 122 is verifying the validity of the programs. Since the sub-CPU 122 periodically clears the counter value of the WDT before completion of the validity verification and the main CPU 101 does it after completion of the validity verification, the configuration of the WDT can be kept simple without a need to switch the timeout threshold in the WDT.

<<4. Modification Examples>>

Figure 11:
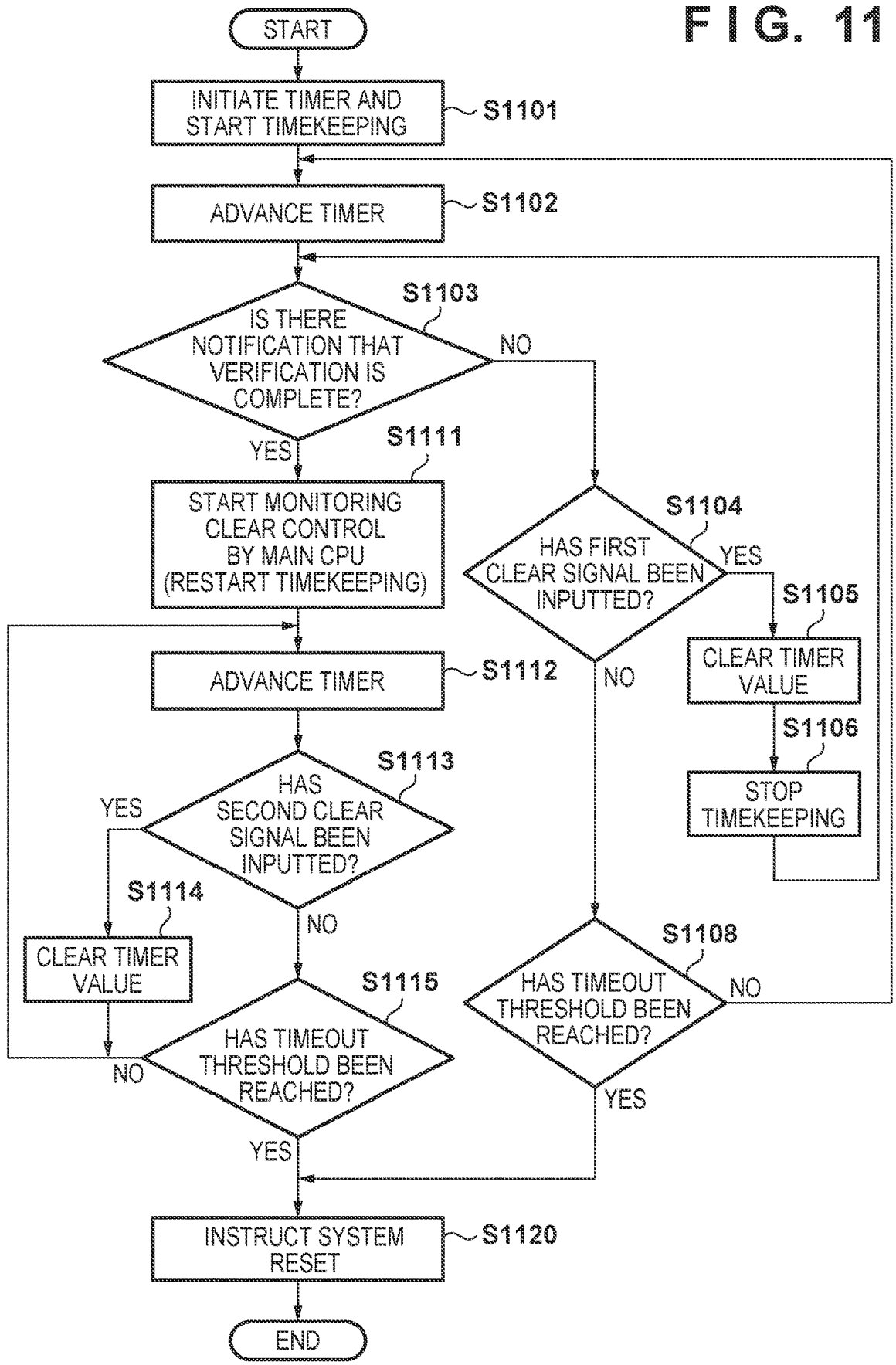
FIG. 11 is a flowchart illustrating an example of a flow of processing executed by the WDT according to a modification example.

The present invention is not limited to the embodiment given above, and may be modified in various ways. For example, in the above described embodiment, an example has been described in which the sub-CPU 122 periodically outputs the first clear signal and the WDT 133 clears the counter value of the timer circuit 502 every time the first clear signal is inputted. Meanwhile, in a modification example, the sub-CPU 122 may only output the first clear signal once and the WDT 133 may stop the timekeeping of the timer circuit 502 based on the input of the first clear signal. The timekeeping of the timer circuit 502 may be restarted, for example, after the program validity has been successfully verified. According to such a modification example, a periodic signal output by the sub-CPU 122 is not necessary, and the sub-CPU firmware 404 size can be reduced. An example of a flow of processing executed by the WDT 133 according to this modification example is illustrated in FIG. 11.

First, in step S1101, in response to the start of the power supply, the WDT 133 initiates the timer circuit 502 and causes the timer circuit 502 to start keeping time. In step S1102, the timer progresses, in other words, the timer circuit 502 increments the counter value. The WDT 133, in step S1103, awaits notification from the sub-CPU 122 that the verification has been completed.

Until the sub-CPU 122 notifies that the verification has been completed, the WDT 133, in step S1104, monitors the first clear signal being inputted from the sub-CPU 122. In a case where the first clear signal is inputted from the sub-CPU 122, the WDT 133 clears the counter value of the timer circuit 502 in step S1105, and stops keeping time in step S1106. Then, the WDT 133 continues to await notification from the sub-CPU 122 that the verification has been completed.

In a case where the first clear signal is not inputted from the sub-CPU 122, the WDT 133, in step S1108, determines whether the counter value of the timer circuit 502 has reached the timeout threshold. In a case where the counter value has not reached the timeout threshold, the processing returns to step S1102. In a case where the counter value has reached the timeout threshold, the processing advances to step S1120. Note that, in a case where the timekeeping is stopped in step S1106, the determination in step S1108 does not need to be performed.

When the sub-CPU 122 notifies that the verification has been completed, the WDT 133, in step S1111, starts monitoring clear control by the main CPU 101. In a case where the timekeeping is stopped in step S1106, the WDT 133 restarts keeping time in response to the notification that the verification has been completed. In step S1112, the timer progresses. In step S1113, the WDT 133 monitors the input (e.g., a writing to the WDT clear register) of the second clear signal from the main CPU 101. In a case where the second clear signal is inputted from the main CPU 101, the WDT 133, in step S1114, clears the counter value of the timer circuit 502 and causes the timekeeping to restart from zero. Then, the processing returns to step S1112. In a case where the second clear signal is not inputted from the main CPU 101, the WDT 133, in step S1115, determines whether the counter value of the timer circuit 502 has reached the timeout threshold. In a case where the counter value has not reached the timeout threshold, the processing returns to step S1112. In a case where the counter value has reached the timeout threshold, the processing advances to step S1120.

In step S1120, the WDT 133 deems that an abnormality has occurred in the MFP 1 (the sub-CPU 122 or the main CPU 101), and instructs a system reset to the reset circuit 132.

In another modification example, the sub-CPU 122, in a case where the programs to be verified for validity are determined to be invalid, may restore the programs using a restoration version of the programs. These restoration versions of the programs are also called golden masters. The golden masters are stored in advance, for example, in a protected region (a region that cannot be rewritten) of a ROM accessible by the sub-CPU 122. Then, the sub-CPU 122, in a case where verification of a program has failed, instead of shifting to a sleep state, overwrites, with the golden master, the program for which the verification has failed. Then, the MFP 1 may initiate normally using the restored program by performing a system reset. In the present modification example, the sub-CPU 122 periodically outputs the first clear signal to the reset control unit 131 to cause the WDT to clear the counter value while restoring a program as well. Accordingly, the system reset is prevented from being executed in the middle of restoring a program using the golden master, and the inconvenience such as the system reset being re-executed unnecessarily or programs being damaged can be prevented.

In another modification example, the reset control unit 131 counts the number of first clear signal inputted from the sub-CPU 122, and it may not clear the WDT counter value in response to the first clear signal being inputted if the number of inputs exceeds a threshold. With this configuration, in a case where a failure occurs in which the verification does not end and the system does not initiate even though the first clear signal is outputted for a reason that processing in the sub-CPU 122 falling into an infinite loop or the like, a system reset can be forced to execute in order to resolve that failure.

Also, in another modification example, the reset control unit 131 may request the sub-CPU 122 to output the first clear signal before the WDT times out. The sub-CPU 122, in a case where no abnormality has occurred to itself, may output the first clear signal to the reset control unit 131 in response to the request from the reset control unit 131. With this configuration, in a case where the program verification is anticipated to end successfully despite the first clear signal output being delayed in the sub-CPU 122 for some reason, a system reset can be avoided and a system initiation can be assisted.

Note that for any signal mentioned above, a format of the signal can differ from what has been described. For example, a polarity or signal level (Hi or Lo) of each signal may be reversed from the examples that have been described. Also, the reset control unit 131 may be connected to the signal bus 110 as a module that is independent from the power source control unit 130 instead of being comprised in the power source control unit 130. Also, any part of the elements of the MFP 1 may be integrated into a system on a chip (SoC).

<<5. Summary>>

So far, embodiments of the present disclosure have been described in detail with reference to FIGS. 1 to 10. In the above described embodiments, in an information processing apparatus including an execution unit configured to execute a program that is determined to be valid by a verification unit, the verification unit is configured to access a timer for reset control (WDT) to clear its counter value before the execution unit becomes accessible to the WDT. The WDT is configured to reset the verification unit and the execution unit when the counter value has reached a predetermined timeout threshold. With this configuration, a timeout of the WDT can be avoided before the validity verification of the program is completed by a supplementary processor (the verification unit) prior to an operation of a main processor (execution unit). Accordingly, because a system reset is not triggered while the verification is advancing normally, normal system initiation can be guaranteed.

In the above described embodiments, the verification unit may periodically clear the counter value of the WDT at an output cycle shorter than the above timeout threshold. With this configuration, the secure boot technology can be combined with the system having the WDT without any significant change made to the existing configuration of the WDT which refers to a single counter value in a manner that the system initiation is not interfered with. Also, in a case where an abnormality occurs in the verification unit, that abnormality can be captured by the WDT timeout, and a system reset can be executed.

Also, in the above described embodiments, the verification unit may, in a case where it is determined that the above program is valid, stop the periodic output of the clear signal for clearing the counter value of the WDT. With this configuration, because the WDT counter value is not cleared by the verification unit after the execution unit starts operating, the abnormality in the execution unit which is the main processor, can be captured appropriately by the WDT.

Also, in the above described embodiments, the verification unit may, in a case where the above program is determined to be valid, notify the reset control unit that the above program has been verified and, in response to that notification, a monitoring of the clear signal from the execution unit may be started in the WDT. With this configuration, because the WDT only needs to monitor the clear signal from the verification unit before it is notified that the verification is complete and the clear signal from the execution unit after it is notified that the verification is complete, it is possible to avoid the operational load of the WDT from increasing.

<<6. Other Embodiments>>

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priorities from Japanese Patent Application No. 2019-171853, filed on Sep. 20, 2019 and Japanese Patent Application No. 2019-221449, filed on Dec. 6, 2019 which are hereby incorporated by references herein in its entirety.

What is claimed is:

1. An information processing apparatus comprising:
a first processor configured to verify a validity of a program;
a control circuit configured to issue a system reset signal in a case where there is no access from outside for a predetermined period; and
a second processor configured to execute the program that has been determined as valid by the first processor, and to become accessible to the control circuit after the program is initiated, wherein
the first processor is configured to access the control circuit before the second processor becomes accessible to the control circuit, and
the first processor is configured to periodically output a first clear signal to the control circuit at an output cycle that is shorter than the predetermined period and thereby cause the control circuit to clear a timer value.

2. The information processing apparatus according to claim 1, wherein
the first processor is configured to stop periodic output of the first clear signal in a case where it is determined that the program is valid.

3. The information processing apparatus according to claim 1, wherein
the first processor is configured to notify the control circuit that a verification of the program is complete in a case where it is determined that the program is valid; and
the control circuit is configured to start monitoring a second clear signal from the second processor in response to the notification from the first processor that the verification is complete.

4. The information processing apparatus according to claim 3, wherein
the second processor is configured to, while operating, output the second clear signal to the control circuit at an output cycle that is shorter than the predetermined period and thereby cause the control circuit to clear the timer value.

5. The information processing apparatus according to claim 1, wherein
the control circuit is configured to count a number of times the first clear signal has been inputted from the first processor and, in a case where the number of inputs exceeds a threshold, not to clear the timer value in response to the first clear signal being inputted.

6. The information processing apparatus according to claim 1, wherein
the control circuit is configured to request the first processor to output the first clear signal and, in a case where the first clear signal is not inputted from the first processor in response to the request, issue the system reset signal.

7. The information processing apparatus according to claim 1, wherein
the first processor is configured to restore the program using a restoration version of the program in a case where it is determined that the program is invalid; and
the first processor is configured to access the control circuit while restoring the program.

8. The information processing apparatus according to claim 1, wherein
the first processor is configured to output the first clear signal to the control circuit before the second processor becomes accessible to the control circuit; and
the control circuit is configured to clear the timer value and stop timekeeping in response to the first clear signal being inputted.

9. The information processing apparatus according to claim 8, wherein the first processor is configured to notify the control circuit that a verification of the program is complete in a case where it is determined that the program is valid; and the control circuit is configured to restart the timekeeping in response to the notification from the first processor that the verification is complete.

10. The information processing apparatus according to claim 1, wherein the program comprises a basic input/output system, BIOS, program of the information processing apparatus.

11. The information processing apparatus according to claim 1, wherein the first processor is configured to access the control circuit by outputting the first clear signal to cause the control circuit to clear the timer value so that a timeout of a timer for triggering issuance of the system reset signal is delayed.

12. A reset control method performed in an information processing apparatus that includes:

a first processor configured to verify a validity of a program;

a control circuit configured to issue a system reset signal in a case where there is no access from outside for a predetermined period; and a second processor configured to execute the program that has been determined as valid by the first processor, and to become accessible to the control circuit after the program is initiated, the method comprising:

accessing, by the first processor, the control circuit before the second processor becomes accessible to the control circuit; and periodically outputting, by the first processor, a first clear signal to the control circuit at a shorter output cycle than the predetermined period to cause the control circuit to clear a timer value.

13. The reset control method according to claim 12, further comprising:

stopping, by the first processor, periodic output of the first clear signal in a case where it is determined that the program is valid.

14. The reset control method according to claim 12, further comprising:

notifying, by the first processor, the control circuit that a verification of the program is complete in a case where it is determined that the program is valid; and starting, by the control circuit, to monitor a second clear signal from the second processor in response to the notification from the first processor that the verification is complete.

15. The reset control method according to claim 14, further comprising:

while the second processor is operating, outputting, by the second processor, the second clear signal to the control circuit at an output cycle that is shorter than the predetermined period and thereby causing the control circuit to clear the timer value.

16. The reset control method according to claim 12, further comprising:

counting, by the control circuit, a number of times the first clear signal has been inputted from the first processor, wherein the control circuit does not clear the timer value in response to the first clear signal being inputted in a case where the number of inputs exceeds a threshold.

17. The reset control method according to claim 12, further comprising:

requesting, by the control circuit, the first processor to output the first clear signal, wherein in a case where the first clear signal is not inputted from the first processor in response to the request, the control circuit issues the system reset signal.

18. The reset control method according to claim 12, further comprising:

restoring, by the first processor, the program using a restoration version of the program in a case where it is determined that the program is invalid, wherein the first processor accesses the control circuit while restoring the program.

19. The reset control method according to claim 12, wherein the first processor outputs the first clear signal to the control circuit before the second processor becomes accessible to the control circuit, and the method further comprises the control circuit clearing the timer value and stopping timekeeping in response to the clear signal being inputted.

\* \* \* \* \*